(12) United States Patent
von Haas et al.

(10) Patent No.: US 8,876,516 B2
(45) Date of Patent: Nov. 4, 2014

(54) PELLET PRESS FOR PRODUCING PELLETS

(75) Inventors: Gernot von Haas, Heidelberg (DE); Gunter Natus, Muhltal (DE); Frank Heymanns, Oberderdingen (DE)

(73) Assignee: Dieffenbacher GmbH Maschinen-und Anlagenbau, Eppingen (DE)

( * ) Notice: Subject to any disclaimer, the term of this patent is extended or adjusted under 35 U.S.C. 154(b) by 14 days.

(21) Appl. No.: 13/498,522

(22) PCT Filed: Sep. 30, 2010

(86) PCT No.: PCT/EP2010/005983
§ 371 (c)(1),
(2), (4) Date: Jun. 6, 2012

(87) PCT Pub. No.: WO2011/038917
PCT Pub. Date: Apr. 7, 2011

(65) Prior Publication Data
US 2012/0244242 A1 Sep. 27, 2012

(30) Foreign Application Priority Data
Sep. 30, 2009 (DE) .......... 10 2009 047 902

(51) Int. Cl.
*B30B 11/28* (2006.01)
*B30B 11/22* (2006.01)
*B30B 11/20* (2006.01)

(52) U.S. Cl.
CPC .......... *B30B 11/228* (2013.01); *B30B 11/221* (2013.01); *Y02E 50/30* (2013.01); *Y02E 50/10* (2013.01); *B30B 11/202* (2013.01)
USPC .......... 425/193; 425/331

(58) Field of Classification Search
USPC .................... 425/193, 331
See application file for complete search history.

(56) References Cited

U.S. PATENT DOCUMENTS 2,171,039 A   8/1939  Meakin
2,178,009 A * 10/1939  Helm .......... 425/331

(Continued)

FOREIGN PATENT DOCUMENTS

CN   101288986 A   10/2008
CN   201192904 Y    2/2009

(Continued)

OTHER PUBLICATIONS

International Search Report dated Jan. 26, 2011, as received in corresponding PCT Application No. PCT/EP2010/005983, 6 pages.

(Continued)

Primary Examiner — James Mackey
(74) Attorney, Agent, or Firm — Foley & Lardner LLP

(57) ABSTRACT

The invention relates to a pellet press for producing pellets (10), there being in the pellet press (3) at least one die (4) having a multiplicity of holes (13) for compressing the biomass (1), at least one roll (5) rolling on the die (4) and at least one drive device for the die (4) and/or the roll (5). The aim of the invention is to produce a pellet press in which it is possible to eliminate local damage or partial wear of the die with the least possible effort or to make it easier to replace the die with a spare part. The invention consists of at least two die segments (7, 7' . . . ) being arranged as the die (4), at least one supporting device (9) being arranged to support the die segments (7, 7' . . . ) with respect to the roll (5), and the supporting device (9) having at least one aperture (8) for the pellets (10) emerging from the holes (13) in the die (4) to be led through.

18 Claims, 3 Drawing Sheets

(56) References Cited

U.S. PATENT DOCUMENTS

Figure 3:
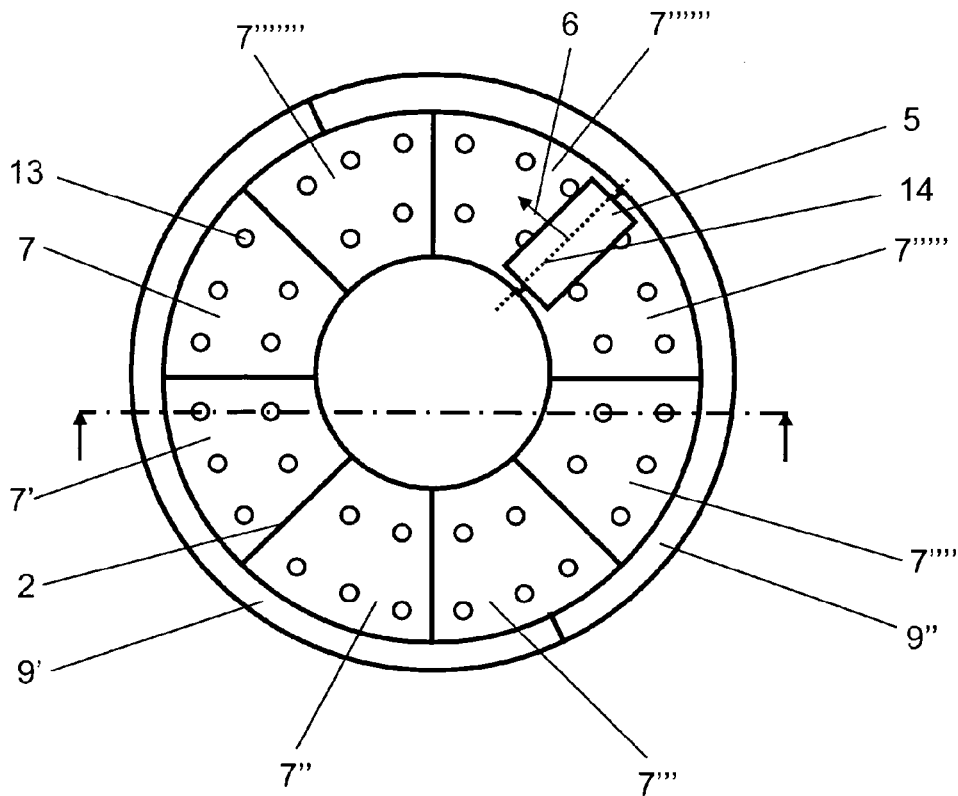

| | | | |
|---|---|---|---|
| 3,518,723 A | 7/1970 | Wooding | |
| 4,354,817 A | 10/1982 | Gilman | |
| 4,446,086 A * | 5/1984 | Molenaar et al. | 425/331 |
| 4,511,321 A * | 4/1985 | Howard | 425/331 |
| 5,198,233 A | 3/1993 | Kaiser | |
| 5,399,080 A * | 3/1995 | Van Benthum | 425/331 |
| 6,375,447 B1 * | 4/2002 | Zitron et al. | 425/331 |
| 6,582,638 B1 * | 6/2003 | Key | 425/331 |
| 2005/0266112 A1 * | 12/2005 | Che | 425/331 |

FOREIGN PATENT DOCUMENTS

| | | | |
|---|---|---|---|
| CN | 201214289 Y | 4/2009 | |
| CN | 201261273 Y | 6/2009 | |
| CN | 201291597 Y | 8/2009 | |
| EP | 0 363 975 A1 | 4/1990 | |
| GB | 0 870 597 A | 6/1961 | |
| GB | 0 992 352 A | 5/1965 | |
| GB | 1 016 163 A | 1/1966 | |
| JP | 59-059240 A | 4/1984 | |
| JP | H0657423 U | 8/1994 | |
| JP | 2000-202272 A | 7/2000 | |

OTHER PUBLICATIONS

Office Action dated Jul. 8, 2013 issued in connection with U.S. Appl. No. 13/498,545.

International Search Report dated Jan. 19, 2011, as received in corresponding PCT Application No. PCT/EP2010/005984, 6 pages.

Final Office Action dated Mar. 25, 2014 issued in connection with U.S. Appl. No. 13/498,545.

Office action dated Jan. 16, 2014 issued in connection with Chinese Application No. 201080044982.4.

Office action dated Jan. 23, 2014 issued in connection with Chinese Application No. 201080044981.X.

Notice of Allowance dated Jul. 14, 2014 issued in connection with U.S. Appl. No. 13/498,545.

* cited by examiner

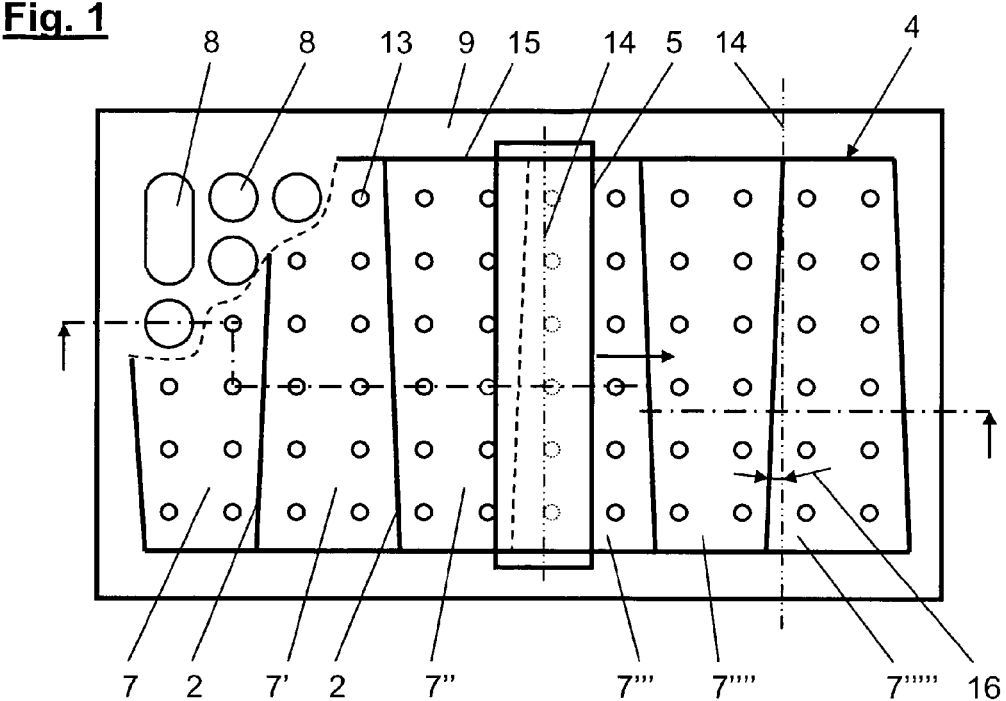
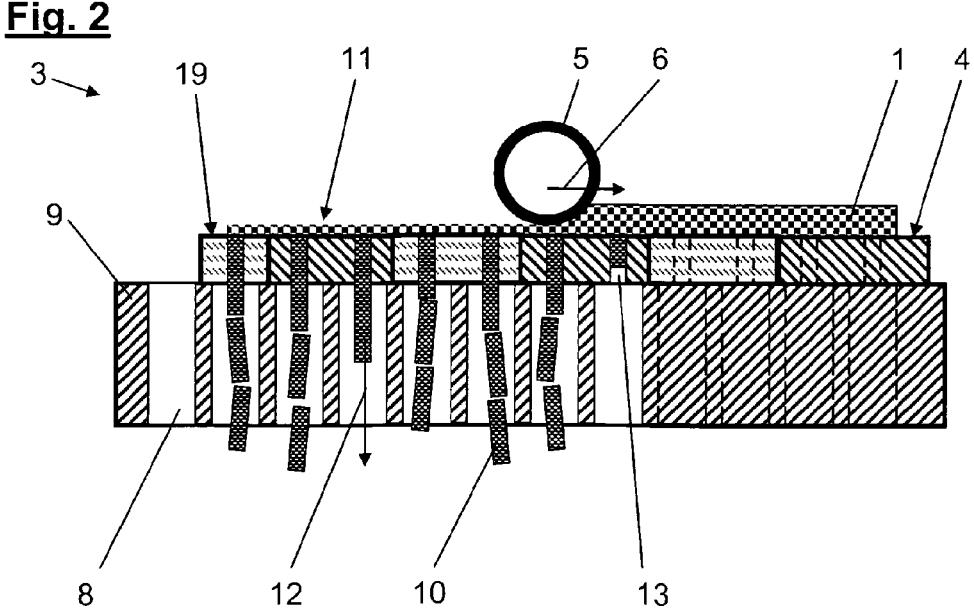

PELLET PRESS FOR PRODUCING PELLETS

CROSS REFERENCE TO RELATED APPLICATIONS

The present invention is a National Stage of International Application No. PCT/EP2010/005983 filed on Sep. 30, 2010, which claims the benefit of German Patent Application No. 10 2009 047 902.3 filed on Sep. 30, 2009. The entire disclosures of which are incorporated herein by reference.

The invention relates to a pelletizing press for producing pellets.

The production of pellets, also referred to as granules, from fine material or compacted and/or molten material is already known. The production of pellets, or wood pellets, from preferably chopped biomass, such as wood chips, sawdust, or the like, is also already sufficiently known and is propagated in the field of renewable energy sources as a pioneering technology for climate protection, in particular in Europe. Typically, chip material from the wood-processing industry is used as the raw material, however, freshly cut timber or types of wood which are not usable in the wood-processing industry or waste materials can also be used. Pollutant-free base material is preferably to be used for the market for wood pellets for supplying small furnace facilities in single-family or multi-family houses. Block power plants or special high-temperature furnace facilities for generating heat and/or obtaining electrical energy (combination power plants) can also cleanly combust pollutant-charged material (pellets made of particle board or medium-density fiberboard with or without a coating or lacquering) in small amounts, however.

The wood pellets are typically produced in so-called pelletizing presses, in which the material to be compressed is pressed through boreholes of a matrix by moving and/or actively rolling rollers, also referred to as pan grinder rollers. The material (biomass) is shaped by the boreholes and discharged as strands from the boreholes. Boreholes are understood as all openings which are preferably implemented as essentially cylindrical, and are arranged in a matrix to feed through and shape the material. The boreholes can also have larger intake areas (depressions) to improve the compression procedure and can be hardened or can have hardened sleeves in the boreholes. A differentiation is made between flat and ring matrices in the field of matrices. Rollers revolve externally or internally around on ring matrices for the compression, on flat matrices, the pan grinder rollers roll circularly (mill construction) or linearly reversing. The invention is preferably concerned with flat matrices of the latter construction, but can optionally also be used with ring matrices. The possibilities for preparing and scattering the biomass, or the post-processing (chopping of the strands, cooling, storage, transport) of the pellets do not have to be discussed in greater detail. Reference is made in this regard to the prior art.

Due to the warming of the climate, which has been acknowledged worldwide in the meantime, the industry has been forced to accelerate and cheapen the large-scale industrial production of wood pellets. An essential wearing part of the pelletizing presses is the matrix itself. Due to the pressing and compaction of the biomass on the walls of the boreholes, high coefficients of friction and pressures occur, which erode the matrix boreholes and enlarge them over time. Simultaneously, it can happen during the supply of the biomass that high-density elements, such as rocks, pieces of metal, or the like, reach the flat matrix and are pressed by the rolling rollers into the matrix. Distortions of the surface of the matrix or frayed areas of the boreholes arise, this in turn results in irregular compression of the residual layer of the biomass on the rolling surface of the matrix, because the biomass of the residual layer can no longer freely flow in all directions due to the disturbances of the rolling surface. A corrugated residual layer arises, which can result in incalculable machine-dynamic oscillations in the pelletizing press. However, high-density clots of the biomass also form, which in turn further damage the rolling surface of the matrix and/or cause increased wear during the passage through the boreholes. In the extreme case, faulty rolling surfaces result in "knocking" or also "banging" rollers, which are harmful overall for the pelletizing press, but also in particular for the rollers and the matrices.

However, it cannot be prevented in the nature of the production that damage or wear of the matrix occurs over a certain period of production time. The reconditioning of a matrix per se can be performed by many types of reconditioning possibilities, such as grinding/planing off the entire matrix, deposit welding in the case of depressions, or drilling out local damage or a borehole and inserting a closure or a sleeve. However, it is not advisable because of relatively locally limited damage to remove an entire matrix together with a pelletizing press from production in order to recondition it. In particular, the processing of biomass must possibly be stopped for this purpose, if the storage bunkers are full or direct production of the pellets is provided without storage capabilities. It is also not possible for facility and economic reasons to keep a complete matrix in reserve, since it is typically among the most expensive machine elements of a pelletizing press and ties up capital unnecessarily during the waiting time for a possible use.

The object of the invention comprises providing a pelletizing press of the above-mentioned type for producing pellets, in which it is possible to remedy local damage or partial wear on a matrix with the least possible outlay or to make the replacement of the matrix with a replacement part significantly easier.

The achievement of the object for a pelletizing press is that at least two matrix segments are arranged as the matrix, at least one support device is arranged to support the matrix segments in relation to the roller, and the support device has at least one passage for feeding through the pellets exiting from the boreholes of the matrix.

A matrix made of high-quality material can advantageously be implemented having the lowest possible thickness and is in multiple parts above all. By splitting the matrix or the rolling surface into multiple parts, complex devices and corresponding installation expenditure for removing a complete matrix can be dispensed with. For example, if the matrix is divided into four, accessibility to the production chamber of approximately 55 to 60° is sufficient to withdraw the matrix from of the pelletizing press and replace it with a new one. The removal of drives, shafts, or other machine elements can be avoided as much as possible. Quick-release fasteners are preferably provided for the matrix segments, in order to accelerate the replacement still further. The invention presumes that within the length of the boreholes of the matrix, the biomass can be sufficiently compressed and can have the required strength and consistency after exiting the boreholes. It is ensured by the support device that the sagging of the matrix remains in a controllable scope and has no consequence on the operation during the pelletizing. The matrix can therefore preferably be manufactured from a high-strength, in particular low-wear material. Hardened materials are also acceptable. Matrices which tend to become brittle or tend toward fatigue fracture may be supported using an intermediate layer to the support device, which results in outstanding damping in relation to harmful oscillations. Furthermore, it is advantageous that local damage to the matrix can be readily replaced, in that one matrix segment is removed from the matrix and a new or reconditioned used matrix segment is reinserted quickly. The shutdown time of the pelletizing press is thus kept low and interfering operational interruptions during the maintenance or the repair of the locally damaged matrix segment do not necessarily have to be accepted.

In an expansion of the object, in the case of a multipart matrix in a pelletizing press, the rolling of the roller on the joint edges of the matrix segments is to be improved and/or the pelletizing press is to be made capable of using matrix segments of different heights with uniform quality of the rolling surface.

The teaching of the invention is also to disclose using very hard or even brittle materials, or partially or completely hardened materials or tool steels, as the matrix. In particular, the present invention allows the matrix itself to be manufactured as thin as possible, for example, 30 to 100 mm thick. Since it is sufficiently supported by the support device, a very costly material or a completely hardened steel or a very hard steel or stainless steel can also be used for this purpose. It is obvious that strands exit from the boreholes of the matrix, which break apart into pellets, which have a greater or lesser length, depending on the biomass used or a pelletizing press having a scissors device for dividing the strands, which is not shown but is possible. However, it has been shown that a cutting device is not necessary after the support device in most cases. Wood pellets in particular tear off independently from the biomass strand exiting from the boreholes of the matrix solely due to the vibration in the pelletizing press. In combination with special processing applications such as temperature, (natural) adhesive additive, or similar applications, however, it can occur that the strands are implemented as relatively resistant to breaking apart. In this regard, it can be advantageous to implement the passages in such a manner that they are only expanded slightly in relation to the boreholes or, with a grooved embodiment of the passages, to implement the groove extension essentially parallel to the rolling line of the roller and therefore to cut the biomass into commercially-typical pellet sizes using a cutting blade which essentially follows the same movement as the roller at regular intervals. According to the understanding of the present invention, the support device or its passages does not form an extension of the boreholes of the matrix in that it does not assume a supporting or shaping task in relation to the biomass, nonetheless, depending on the embodiment variation, the passages being able to be used as stops for a movable or rotating blade for dividing the strands.

Further advisable and possible embodiments are described hereafter:

To support the matrix, the support device can be arranged essentially on the joint edges of the matrix segments and/or overlapping the joint at the edges of the matrix. The latter is preferably advisable in the case of narrow matrices. However, the joint edges of the matrix segments are preferably particularly supported by the support device, so that sagging does not occur due to the heavy roller or even multiple heavy rollers. In particular plastic sagging on a matrix results in bulging of the joint edges and dropping or knocking rollers at the transition from one matrix segment to the next. In a preferred exemplary embodiment, an essential property of the passages of the support device is that they are introduced as large as possible, possibly even as grooves or openings in the support device, so that the static carrying capacity or the matrix is essentially sufficient and it experiences no or only harmless sagging. It is also advisable according to a further exemplary embodiment to implement the passages as substantially larger than the boreholes, the exiting strands, or the pellets. If mechanically cutting apart the pellets appears advisable, independently of the size of the passages, a cutting device can be arranged on the side of the support device facing away from the matrix. For expedient replacement and in particular in the case of a plurality of matrix segments, it is preferable for the individual matrix segments to be essentially identical or similar. This preferably applies to the arrangement of the boreholes, the geometry, and/or the joint edges to the adjacent matrix segments.

The joint edges of the matrix segments are particularly preferably arranged essentially parallel to the rolling line of the roller. In a further exemplary embodiment, the joint edge is particularly preferably arranged essentially at an angle to the rolling line of the roller, the angle being able to cover a range between 0 and 35°.

In particular, however, to join the matrix segments to one another, it is preferable for the joint edges to be implemented as tongue-and-groove connections and/or as zigzag connections and/or as arrow-shaped connections. The above exemplary embodiments may be applied particularly advantageously in a matrix which consists of matrix segments which are arranged in a plane. The matrix would preferably be implemented as rectangular or circular for this purpose. The matrix and/or the support device is particularly preferably implemented as partially or completely hardened and/or made of hardened material. In different types of embodiment of the support device, it can consist of multiple support segments. In this case, the joint edges of the support segments can substantially differ from the joint edges of the matrix segments in their location to one another and/or in their embodiment. This is used to improve the support of the matrix, the special measures which were proposed above for the rolling surface not having to be applied for the joint edges of the support device. Overall, the action of the support device is such that the sag of the matrix is less than 0.05 mm along the rolling line of the roller. For optimum support, the support device can be arranged pressing against essentially the entire area of the matrix in the passage direction of the biomass. The support device is preferably implemented as essentially plate-shaped. To avoid the transmission of vibrations and/or heat, an insulating and/or damping intermediate layer can be arranged between the matrix or the matrix segments and the support device. At least one hydraulic and/or pneumatic positioning device can be arranged between the matrix or the matrix segments on the support device and/or as the support device.

This positioning device can particularly preferably be used to form a uniform rolling surface made of matrix segments of different heights. At least one plastic, an insulation, a metal plate, and/or a hydraulic cushion would be conceivable as the intermediate layer. The latter is preferably adjustable in its action. If an intermediate layer is used, the passages of the support device are preferably completely or partially reproduced therein. However, only the number and the location of the boreholes can also be reproduced.

Further advantageous measures and embodiments of the subject matter of the invention are disclosed in the subclaims and the following description of the drawing.

Figure 4:
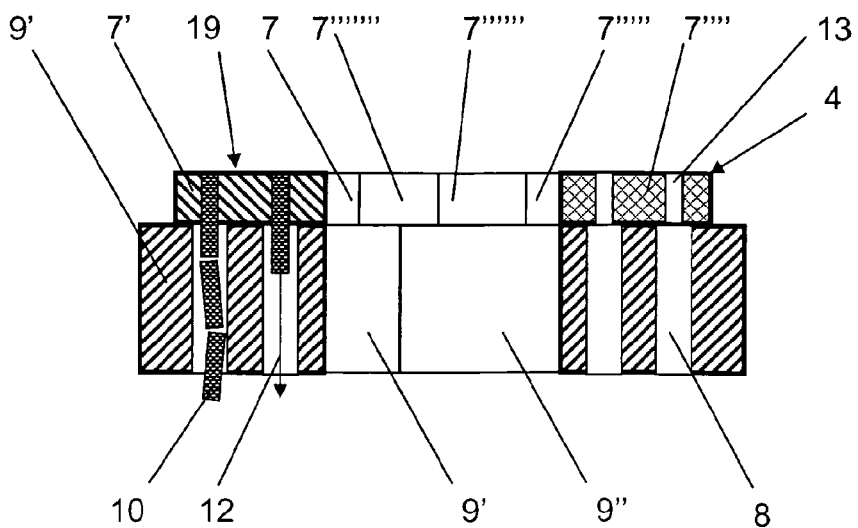
Figure 5:
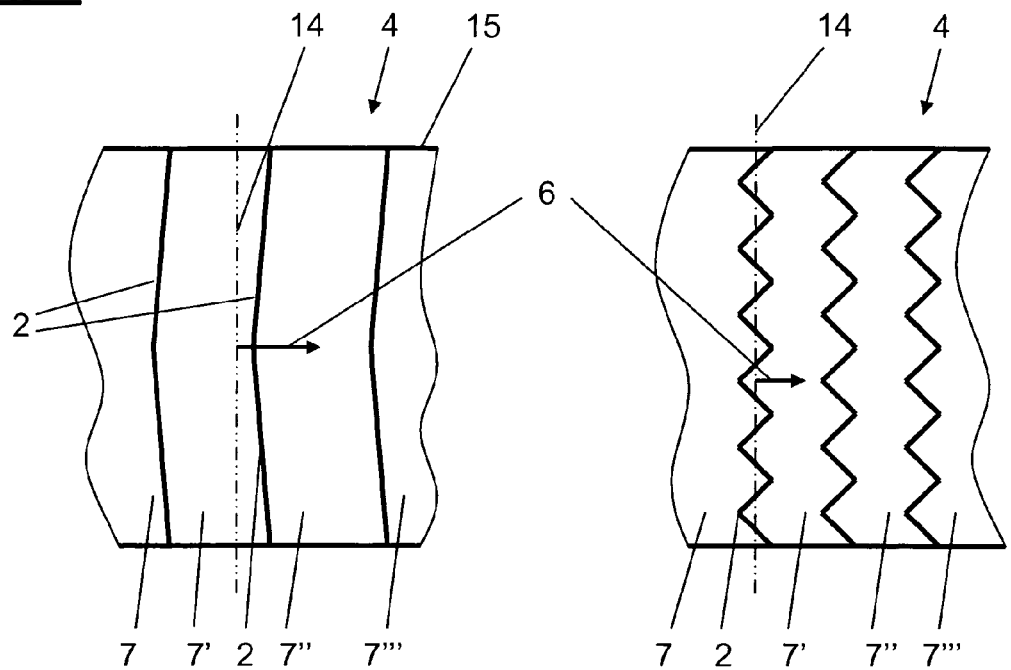
Figure 6:
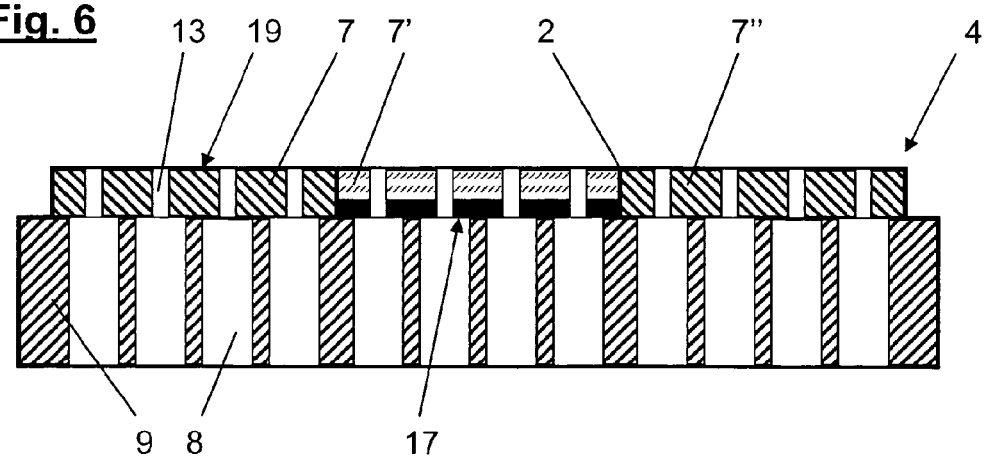
Figure 7:
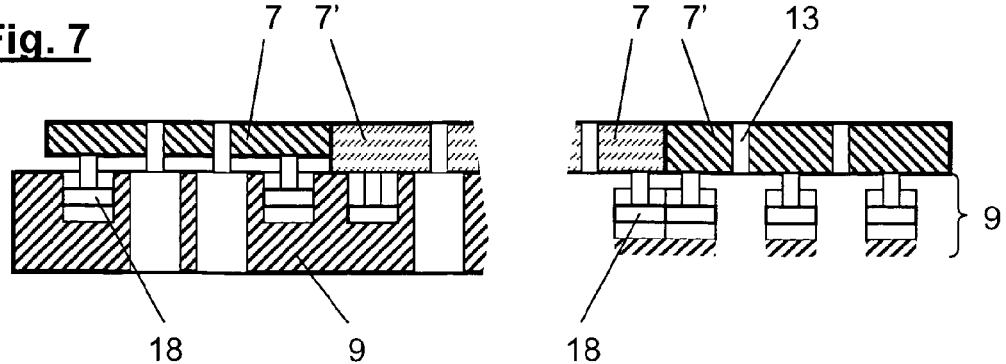

In the figures:

FIG. 1 shows a top view of a rectangular multipart flat matrix and a support device located underneath in a pelletizing press having a reversing roller, FIG. 2 shows a section along a section line in FIG. 1 through the multipart matrix and the support device, FIG. 3 shows a top view of a multipart circular matrix having a multipart support device arranged underneath in a pelletizing press having a revolving roller, FIG. 4 shows a section along a section line in FIG. 3 through the multipart matrix and the multipart support device, FIG. 5 shows a simplified view of possible joint edges of the matrix segments to improve the rolling of the roller, FIG. 6 shows a section through a multipart matrix having matrix segments of different heights, and FIG. 7 shows a simplified view of a support device (left) having actively movable and adjustable positioning devices or a support device (right) formed from multiple actively movable and adjustable positioning devices for the matrix segments or a matrix.

FIG. 1 shows a top view of a rectangular multipart flat matrix 4, which is laid on a support device 9. A roller 5 rolls on the matrix 4 and/or the matrix 4 is moved together with the support device 9 in a reversing manner from left to right and back. In the drawing, a movement to the right in the rolling direction 6 is shown in particular. The matrix 4 consists according to the drawing of six matrix segments 7, 7', ..., 7''''', which are each arranged rotated by 180° and pressing against one another at the joint edges 2. The angled arrangement of the joint edges 2 having an angle 16 to the rolling line 14 of the roller 5 allows soft rolling on the matrix 4. It is unimportant whether the matrix 4 is moved, or whether the roller 5 is moved and/or the roller 5 also has an independent drive for independent rotation in addition to the movement direction. Boreholes 13 are arranged in the matrix 4, which preferably correspond to the passages 8 of the support device 9. Of course, it is possible that one large passage 8 corresponds to multiple boreholes 13, as shown on the top left in FIG. 1 with the aid of a grooved passage 8.

According to FIG. 2, the biomass 1 is scattered onto the matrix during production and pressed by the rolling roller 5 into the boreholes 13 in the direction of the feedthrough direction 12. A residual layer 11 can form on the rolling surface 19 after the passage of the roller 5. After passing through the boreholes 13, strands or pellets 10 form upon exit from the boreholes 13 on the flat side 20, which require further treatment or further transport.

An alternative embodiment of the pelletizing press 3 is shown in FIG. 3, which now uses revolving rollers 5 and a circular matrix 4 made of multiple matrix segments 7 to 7''''', which are arranged like slices of a cake. The support device also forms the foundation for a preferably thin matrix 4 here, which consists of multiple matrix segments 7 to 7'''''. The simple capability for direct replacement of damaged matrix parts and repair during operation also exists in the case of cake-shaped matrix segments 7 to 7''''' with the same embodiment. For this purpose, at least one matrix segment 7 to 7''''' is preferably kept in reserve in the area of the pelletizing press 3 and replaced as needed after removing a damaged matrix segment.

FIG. 4 again shows a sectional view, in a further embodiment, the support device 9, 9' being implemented in multiple parts, but having passages 8 for feeding through the pellets 10 in the feedthrough direction 12.

FIG. 5 shows multiple exemplary possibilities for connecting matrix segments 7 to 7''''' in such a manner that the rolling line 14 of the roller 5 is not identical to the alignment of the joint edges 2. As is obvious in the left of the figure, a joint edge can be implemented as an arrow edge for this purpose. The roller 5 having its rolling line 14 therefore does not roll suddenly over the joint edge 2, but rather over a longer area. A zigzag connection between multiple matrix segments 7 to 7''''' is shown on the right side. It is also obvious here that the matrix segment 7', for example, can be readily lifted up and replaced with a similar or identical matrix segment. In the event of unequal heights of the matrix segments after long wear and polishing or grinding procedures, an optimum rolling surface 19 is no longer ensured.

In order to nonetheless be able to use these matrix segments, it is possible according to FIG. 6 that an intermediate layer 17 is inlaid below a thinner matrix segment 7', which compensates for the height difference to the adjacent matrix segments 7 and 7''.

FIG. 7 shows an alternative embodiment in which positioning devices 18, which are introduced in the case of the matrix segment 7' having an original height and are correspondingly extended in the case of a matrix segment 7 of lesser height in order to implement a level rolling surface 19, are arranged in the support device 9. To improve a uniform force transmission between the positioning devices 18 and the matrix segments, suitable intermediate layers can also be provided here as force distributors. On the right side, the support device 9 is not implemented by a plate-shaped support as in the preceding figures, but rather results from multiple mounted positioning devices 18, which quasi-mount the matrix segments on a hydraulic cushion.

A further exemplary embodiment for optimizing the drilling pattern on the rolling surface 19 in the case of extreme forces and/or a large number of boreholes 13 is not shown in the figures. For this purpose, the boreholes 13 in the area of a joint edge 2 of a matrix segment 7, 7', ... to form a uniform drilling pattern on the rolling surface 19, are arranged diagonally inside the matrix segment 7, 7' ... in such a manner that the support device 9 is not tangent in the area of the joint edge 2. In other words, this means that the boreholes 13, which extend essentially from one flat side to the other flat side, are arranged diagonally from the rolling surface 19 in the direction of the adjacent boreholes 13 at the edge of one matrix segment with uniform drilling pattern. Therefore, the possible support area for the support device 9 on the bottom side of the matrix segments is increased at the joint edges 2. The diagonally extending boreholes 13 are not restricted to this area or this application, however.

An alternative for the fixation of the location and/or the play of the matrix 4 to the support device 9 is also not shown in the figures. This can be at least one side wall of the support device 9, which is installed upright or is associated with the carrier plate 9, and which is optionally provided at regular intervals. The side wall can be implemented in one piece with the support device and represent a protrusion or a bulge. Alternatively, an L-profile would be conceivable, which overlaps the matrix at least in the outer area.

A side wall is practically used for delimiting the filling area or the rolling surface 19 of the biomass. Another alternative for the fixation of the support device in the matrix to one another would be two corresponding pocket boreholes of the matrix 4 and the carrier plate 9. An expansion sleeve inserted therein has the advantage in this context that thermal expansions of the matrix or fitting inaccuracies can be readily absorbed, without the expansion sleeve shearing off, in contrast to a bolt. Slight displacement advantageously also does not worsen the result of the pelletizing, since minimal displacement or imprecise dimensional accuracy can be compensated for without difficulty due to the passages, which are larger than the boreholes.

Fundamentally, efforts have been made to produce a matrix, preferably from a uniform steel. For example, a so-called knife steel such as X46Cr13 (1.4034) is particularly suitable for this purpose, which, having a martensitic microstructure and being stainless, represents a good compromise between corrosion resistance, service life, and susceptibility to brittle fracture.

The pelletizing press 3 is particularly preferably suitable for producing pellets 10 from biomass 1 for use in fireplaces, but can also be safely and expediently used in other fields.

LIST OF REFERENCE NUMERALS

DP 1385

1 biomass
2 joint edge of 7
3 pelletizing press
4 matrix
5 roller
6 rolling direction
7 matrix segment
8 passage
9 support device
10 pellets
11 residual layer
12 feedthrough direction
13 boreholes
14 rolling line
15 edges of 7
16 angle
17 intermediate layer
18 positioning device
19 rolling surface
20 flat side

The invention claimed is:

1. A pelletizing press for producing pellets from biomass, the pelletizing press comprising:
   at least one matrix having a plurality of boreholes for compression of the biomass, the matrix comprising at least two matrix segments,
   at least one roller adapted to roll on the matrix,
   at least one drive device for the matrix and/or the roller being arranged in the pelletizing press, and
   at least one support device arranged to support the matrix segments in relation to the roller,
   wherein the support device has at least one passage for feeding through the pellets exiting from the boreholes of the matrix, and
   wherein joint edges of the matrix segments are arranged at an angle to a rolling line of the roller.

2. The pelletizing press according to claim 1, wherein, to support the matrix segments, the support device is arranged at the joint edges of two matrix segments and/or overlapping edges of the matrix.

3. The pelletizing press according to claim 1, wherein the boreholes are arranged diagonally inside the matrix segments in an area of the joint edges of adjacent matrix segments to form a uniform drilling pattern on a rolling surface such that the support device is not tangent to the matrix in the area of the joint edges.

4. The pelletizing press according to claim 1, wherein the passage or passages are implemented as larger than the boreholes and/or the pellets.

5. The pelletizing press according to claim 1, wherein the matrix is implemented as rectangular or circular.

6. The pelletizing press according to claim 1, wherein the support device is arranged to press against essentially an entire area of the matrix in a feedthrough direction of the biomass.

7. The pelletizing press according to claim 1, wherein the support device is implemented as plate-shaped.

8. The pelletizing press according to claim 1, wherein an insulating and/or damping intermediate layer is arranged between the matrix and the support device.

9. The pelletizing press according to claim 1, wherein the support device comprises multiple support segments.

10. The pelletizing press according to claim 9, wherein, joint edges of the support segments substantially differ from the joint edges of the matrix segments in their location to one another and/or in their structure.

11. The pelletizing press according to claim 1, wherein the pelletizing press is configured to receive biomass comprised of fibers, chips, or shreds containing cellulose, lignocellulose or a combination thereof.

12. The pelletizing press according to claim 1, wherein the pelletizing press is configured to produce fireplace fuel pellets.

13. A pelletizing press for producing pellets from biomass, the pelletizing press comprising:
   at least one matrix having a plurality of boreholes for compression of the biomass, the matrix comprising at least two matrix segments,
   at least one roller adapted to roll on the matrix,
   at least one drive device for the matrix and/or the roller being arranged in the pelletizing press, and
   at least one support device arranged to support the matrix segments in relation to the roller,
   wherein the support device has at least one passage for feeding through the pellets exiting from the boreholes of the matrix, and
   wherein, to join the matrix segments to one another, joint edges are implemented as tongue-and-groove connections, zigzag connections, arrow-shaped connections or a combination thereof.

14. A pelletizing press for producing pellets from biomass, the pelletizing press comprising:
   at least one matrix having a plurality of boreholes for compression of the biomass, the matrix comprising at least two matrix segments,
   at least one roller adapted to roll on the matrix,
   at least one drive device for the matrix and/or the roller being arranged in the pelletizing press, and
   at least one support device arranged to support the matrix segments in relation to the roller,
   wherein the support device has at least one passage for feeding through the pellets exiting from the boreholes of the matrix, and
   wherein at least one hydraulic and/or pneumatic positioning device is arranged between the matrix or the matrix segments on the support device and/or as the support device.

15. A pelletizing press for producing pellets from biomass, the pelletizing press comprising:
   at least one matrix having a plurality of boreholes for compression of the biomass, the matrix comprising at least two matrix segments,
   at least one roller adapted to roll on the matrix,
   at least one drive device for the matrix and/or the roller being arranged in the pelletizing press, and
   at least one support device arranged to support the matrix segments in relation to the roller,
   wherein the support device has at least one passage for feeding through the pellets exiting from the boreholes of the matrix, and
   wherein at least one intermediate layer and/or at least one positioning device is provided to form a uniform rolling surface made of the matrix segments, wherein the matrix segments have different heights.

16. The pelletizing press according to claim 15, wherein at least one plastic, an insulation, a metal plate, and/or a hydraulic cushion is arranged as the intermediate layer.

17. The pelletizing press according to claim 15, wherein the passages of the support device are completely or partially reproduced in the intermediate layer.

18. A pelletizing press for producing pellets, the pelletizing press comprising:
- at least one matrix having a plurality of boreholes for compression of a material, the matrix comprising at least two matrix segments,
- at least one roller adapted to roll on the matrix,
- at least one drive device for the matrix and/or the roller being arranged in the pelletizing press, and
- at least one support device arranged to support the matrix segments in relation to the roller,
- wherein the support device has at least one passage for feeding through the pellets exiting from the boreholes of the matrix, and wherein joint edges of the matrix segments are arranged at an angle to a rolling line of the roller.

* * * * *